(12) United States Patent
He et al.

(10) Patent No.: US 8,677,425 B2
(45) Date of Patent: Mar. 18, 2014

(54) METHOD AND SYSTEM FOR IMPLEMENTING INTERACTION BETWEEN SET-TOP BOX (STB) AND HOME GATEWAY

(75) Inventors: Baolin He, Shenzhen (CN); Xinying Liu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/258,293

(22) PCT Filed: Sep. 2, 2010

(86) PCT No.: PCT/CN2010/076583
§ 371 (c)(1),
(2), (4) Date: Jun. 21, 2012

(87) PCT Pub. No.: WO2011/143867
PCT Pub. Date: Nov. 24, 2011

(65) Prior Publication Data
US 2013/0061278 A1    Mar. 7, 2013

(30) Foreign Application Priority Data
May 18, 2010  (CN) .......................... 2010 1 0178059

(51) Int. Cl.
*H04N 7/16*    (2011.01)
*H04N 7/18*    (2006.01)
*H04N 7/173*   (2011.01)

(52) U.S. Cl.
USPC ................... 725/80; 725/25; 725/82; 725/93; 725/96; 725/119

(58) Field of Classification Search
None
See application file for complete search history.

(56) References Cited

U.S. PATENT DOCUMENTS 5,570,347 A * 10/1996 Bestler et al. ................. 370/461
7,739,393 B2 * 6/2010 Lu et al. ........................ 709/230

(Continued)

FOREIGN PATENT DOCUMENTS

CN    1933493 A     3/2007
CN  101540763 A     9/2009

(Continued)

OTHER PUBLICATIONS

International Search Report for PCT/CN2010/076583 dated Jan. 6, 2011.

*Primary Examiner* — Brian T Pendleton
*Assistant Examiner* — Jonathan V Lewis
(74) *Attorney, Agent, or Firm* — Ling Wu; Stephen Yang; Ling and Yang Intellectual Property

(57) ABSTRACT

The present invention provides a Set-Top Box, a home gateway, and a method and a system for implementing interaction between the Set-Top Box and the home gateway, and the method comprises: the Set-Top Box transmitting a subscription message to the home gateway by means of a UPnP protocol message; the home gateway receiving and parsing the subscription message, combining a subscription response event according to the parsed subscription information, and then transmitting the subscription response event to the Set-Top Box by means of a UPnP protocol message; and the Set-Top Box triggering a corresponding operation according to a subscription response event message, after receiving the subscription response event message. The flexible coordination between the home gateway and the Set-Top Box can be implemented in accordance with the present invention, which can achieve the purposes of automatic diagnosis and automatic adjustment of services, and improve the user experience effectively.

8 Claims, 3 Drawing Sheets

(56) References Cited

U.S. PATENT DOCUMENTS

| | | | |
|---|---|---|---|
| 7,916,652 B1* | 3/2011 | Lima et al. | 370/252 |
| 8,205,235 B2* | 6/2012 | Hlasny et al. | 725/80 |
| 8,281,346 B2* | 10/2012 | Choi et al. | 725/80 |
| 8,347,341 B2* | 1/2013 | Markley et al. | 725/82 |
| 8,356,083 B2* | 1/2013 | Maeng et al. | 709/218 |
| 8,370,880 B2* | 2/2013 | Ghahramani | 725/81 |
| 8,464,303 B2* | 6/2013 | Sofman et al. | 725/115 |
| 8,495,187 B2* | 7/2013 | Kim | 709/223 |
| 2005/0265240 A1* | 12/2005 | Jain et al. | 370/241 |
| 2006/0037036 A1* | 2/2006 | Min et al. | 725/1 |
| 2006/0041924 A1* | 2/2006 | Bushmitch et al. | 725/132 |
| 2006/0168635 A1* | 7/2006 | Terashima et al. | 725/110 |
| 2006/0282863 A1* | 12/2006 | Bushmitch et al. | 725/80 |
| 2007/0150926 A1* | 6/2007 | Zuo | 725/100 |
| 2008/0098441 A1* | 4/2008 | Son | 725/80 |
| 2009/0100492 A1* | 4/2009 | Hicks et al. | 725/127 |
| 2009/0193469 A1* | 7/2009 | Igarashi | 725/56 |
| 2009/0252176 A1* | 10/2009 | Morita et al. | 370/401 |
| 2009/0260042 A1* | 10/2009 | Chiang | 725/80 |
| 2009/0300673 A1* | 12/2009 | Bachet et al. | 725/31 |
| 2009/0323516 A1* | 12/2009 | Bhagwan et al. | 370/216 |
| 2010/0095332 A1* | 4/2010 | Gran et al. | 725/93 |
| 2010/0217837 A1* | 8/2010 | Ansari et al. | 709/218 |
| 2011/0107364 A1* | 5/2011 | Lajoie et al. | 725/25 |

FOREIGN PATENT DOCUMENTS

| | | |
|---|---|---|
| CN | 101820499 A | 9/2010 |
| WO | 2007/071282 A1 | 6/2007 |

\* cited by examiner

METHOD AND SYSTEM FOR IMPLEMENTING INTERACTION BETWEEN SET-TOP BOX (STB) AND HOME GATEWAY

TECHNICAL FIELD

The present invention relates to the Internet Protocol Television (IPTV) technology, and more especially, to a Set-Top Box, a home gateway, and a method and a system for implementing the interaction between the Set-Top Box and the home gateway.

BACKGROUND OF THE RELATED ART

With the progressive development of the internet and its application technologies, people can use the internet to develop increasingly rich applications and services, wherein, a service that is most common and users are most interested in as well is the video service at present. As a portal of access to the internet by home users, a home gateway has integrated more and more rich video application services, including services such as IPTV, online viewing, video surveillance etc.; wherein, a service that is most common and by which the maximum revenue is gained by operators is the IPTV service currently, while as two important devices carrying the IPTV service in a home network, i.e., the home gateway and a Set-Top Box, the service coordination therebetween appears particularly important.

In the actual development of the current IPTV services, since the IPTV service control and data flow involve a plurality of network links, and the quality condition of the network itself will also lead to the instability of the video stream and meanwhile bring some challenges and difficulty to the development of video services of the Set-Top Box, it results in the Set-Top Box sometimes needing to diagnose network failures automatically or adjust services dynamically according to actual conditions. While such diagnosis and adjustment sometimes need the coordination of the home gateway device, for example, whether it is a home gateway failure, or whether it is the time to trigger re-initiating of services, and so on.

For the aforementioned actual conditions, the gateway device and the Set-Top Box in the home networking cannot actually implement the dynamic exchange of information currently, and is often configured and completed at one time on the home gateway and the Set-Top Box according to the networking conditions; if significant adjustments are required, no adjustment is carried out in most cases unless the corresponding configurations of the gateway and the Set-Top Box are adjusted manually, which does not achieve a good effect of the user experience; and when faults such as service interruptions etc. occur, the Set-Top Box cannot be automatically diagnosed, all of which are determined as network failures, thus lacking accuracy.

SUMMARY OF THE INVENTION

The technical problem to be solved by the present invention is to provide a Set-Top Box, a home gateway, and a method and a system for implementing the interaction between the Set-Top Box and the home gateway, so as to realize automatic and dynamic interaction between the home gateway and the Set-Top Box.

In order to solve the aforementioned technical problem, the present invention provides a method for implementing interaction between a Set-Top Box and a home gateway, comprising:

the Set-Top Box transmitting a subscription message to the home gateway by means of a Universal Plug and Play (UPnP) protocol message;

the home gateway receiving and parsing the subscription message, combining a subscription response event according to the parsed subscription information, and then transmitting the subscription response event to the Set-Top Box by means of a UPnP protocol message; and the Set-Top Box triggering a corresponding operation according to a subscription response event message, after receiving the subscription response event message.

The above method further has the following characteristics: the subscription information comprising subscription of diagnostic information of video streams;

combining the subscription response event according to the parsed subscription information comprises: if the parsed subscription information is the subscription of the diagnostic information of the video streams, acquiring video stream traffic information, and combining the video stream traffic information into the subscription response event; and triggering a corresponding operation according to the subscription response event message comprises: extracting the video stream traffic information from the subscription response event message, and performing fault diagnosis according to the video stream traffic information.

The aforementioned method further has the following characteristics: combining the video stream traffic information into the subscription response event being periodic.

The aforementioned method further has the following characteristics: the subscription information comprising the subscription of bridge connection information, combining the subscription response event according to the parsed subscription information comprises: if the parsed subscription information is the subscription of the bridge connection information, determining whether the bridge connection link is available, and if the bridge connection link is available, combining the information of the available bridge connection link into the subscription response event message; and during a process of triggering the corresponding operation according to the subscription response event message, extracting the information of the bridge connection link, and initiating a connecting request according to the information of the bridge connection link.

In order to solve the aforementioned problem, the present invention further provides a Set-Top Box, which comprises:

a Universal Plug and Play (UPnP) control point module, configured to transmit a subscription message to a home gateway by means of a UPnP protocol message; and notify a first function service module with a message after receiving a subscription response event message transmitted by the home gateway by means of a UPnP protocol message; and the first function service module, configured to trigger a corresponding operation according to the subscription response event message, after receiving the notification.

The aforementioned Set-Top Box further has the following characteristics: the subscription information comprises subscription of information of video streams, and the subscription response event message carries video stream traffic information; and the first function service module is a diagnostic module, which is configured to perform fault diagnosis according to the video stream traffic information.

The aforementioned Set-Top Box further has the following characteristics: the subscription information comprises subscription of information of the bridge connection bearing an Internet Protocol Television (IPTV) service; and the subscription response event message carries the information of a bridge connection link bearing the IPTV service, and the first function service module is a connection initiating module, which is configured to initiate a connection request according to the information of the bridge connection link.

In order to solve the aforementioned problem, the present invention further provides a home gateway, comprising a Universal Plug and Play (UPnP) Internet Gateway Device (IGD) module and a second function service module, wherein, the UPnP IGD module is configured to receive and parse a subscription message transmitted by a Set-Top Box by means of a UPnP protocol message, issue the parsed subscription information to a corresponding second function service module; and combine the service information transmitted by the second function service module into a subscription response event message, and then transmit the subscription response event message to the Set-Top Box by means of a UPnP protocol message; and the second function service module is configured to transmit the corresponding service information to the UPnP IGD module after receiving the subscription information.

The aforementioned home gateway also has the following characteristics: the subscription information is subscription of diagnostic information of video streams, and the second function service module is a traffic statistic module, the UPnP IGD module is configured to issue the parsed subscription of the diagnostic information of the video streams to the traffic statistic module; combine video stream traffic information transmitted by the traffic statistic module into a subscription response event message, and then transmit the subscription response event message to the Set-Top Box by means of a UPnP protocol message; and the traffic statistic module is configured to transmit the video stream traffic information to the UPnP IGD module, after receiving the subscription of the diagnostic information of the video streams.

The aforementioned home gateway also has the following characteristics: the subscription information is subscription of information of a bridge connection bearing an Internet Protocol Television (IPTV) service, and the second function service module is a bridge connection function module, the UPnP IGD module is configured to issue the parsed subscription of the information of the bridge connection bearing the IPTV service to the bridge connection function module, combine the information of the bridge connection link transmitted by the bridge connection function module into a subscription response event message, and then transmit the subscription response event message to the Set-Top Box by means of a UPnP protocol message; and the bridge connection function module is configured to determine whether the bridge connection link bearing the IPTV service is available after receiving the subscription of the information of the bridge connection bearing the IPTV service, and transmit the information of the corresponding bridge connection link to the UPnP IGD module, if the bridge connection link bearing the IPTV service is available.

In order to solve the aforementioned problem, the present invention further provides a system including the above Set-Top Box and the above home gateway, wherein, the Set-Top Box and the home gateway interact with each other by means of a UPnP protocol message.

In summary, the Set-Top Box, the home gateway, and the method and system for implementing the automatic interaction between the home gateway and the Set-Top Box provided by the present invention can realize the flexible coordination between the home gateway and the Set-Top Box, and can achieve the purposes of automatic diagnosis and automatic adjustment of services, thus improving the user experience effectively.

PREFERRED EMBODIMENTS OF THE PRESENT INVENTION

The core idea of the present invention is to take advantage of the Universal Plug and Play (UPnP) subscription technology and perform service expansion on the existing object category of a UPnP Internet Gateway Device (IGD), to realize a dynamic and automatic interaction between a home gateway and a Set-Top Box, so as to complete automatic diagnosis of faults and automatic adjustment of services.

The technical scheme of the present invention will be illustrated in detail in combination with accompanying drawings and preferred embodiments hereinafter. The following embodiments illustrated are only used to illustrate and explain the present invention rather than constructing limitation to the technical scheme of the present invention.

Figure 1:
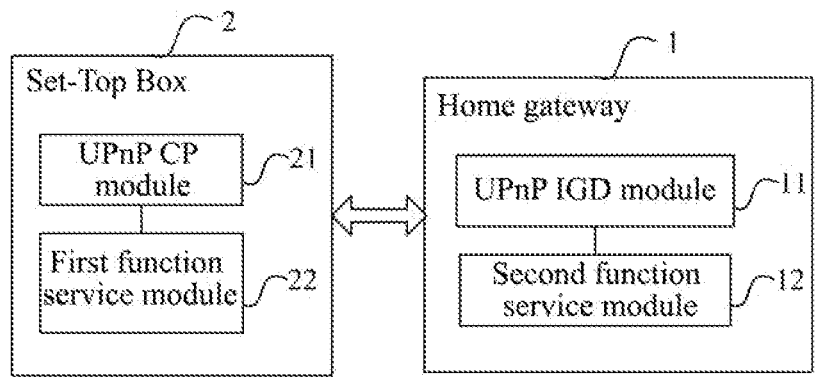
FIG. 1 is a diagram of an IPTV service system in accordance with an embodiment of the present invention.

FIG. 1 is a diagram of an IPTV service system in accordance with an embodiment of the present invention. As shown in FIG. 1, the IPTV service system in accordance with the present embodiment comprises: a home gateway 1 and a Set-Top Box 2.

The Set-Top Box 2 in the present embodiment can comprise:

a UPnP control point module (i.e., a UPnP CP module) 21, which is configured to implement the interaction with a UPnP IGD module 11 of the home gateway (HG for short) 1.

In the present invention, the UPnP control point module is configured to transmit a subscription message to the home gateway by means of a UPnP protocol message; and extract subscription content information after receiving a subscription response event message transmitted by the home gateway by means of a UPnP protocol message, and notify a first function service module with a message.

The first function service module 22 is configured to implement specific service functions, for example, the services such as fault diagnosis, connection requests, determination of the video-on-demand service strategy etc.

For example, the first function service module can be a diagnosis module, which is configured to diagnose various faults and store log information of the various faults; and can also be a connection initiating module, which is configured to re-initiate an Electronic Program Guide (EPG) request etc.

The home gateway 1 in the present embodiment can comprise:

a UPnP IGD module 11, wherein, the present invention needs to expand objects and parameters required by the interaction with the UPnP CP module, under the standard UPnP IGD object model; for example, for the diagnosis function of the Set-Top Box, the traffic statistic object is expanded, and the parameters are a number of received messages on a certain interface, and a statistic interval and so on; and for the automatic connection initiating function of the Set-Top Box, the object of the link bearing the IPTV is expanded, and the parameters are a link state, and so on.

In the present invention, the UPnP IGD module is configured to receive and parse the subscription message transmitted by the Set-Top Box by means of a UPnP protocol message, and issue the parsed subscription information to a corresponding second function module; and combine service information transmitted by the second function service module into a subscription response event message, and then transmit the subscription response event message to the Set-Top Box by means of a UPnP protocol message.

The second function service module 12 is a specific function module, such as checking a bridge connection link, counting the transmitted and received data packets, acquiring the support conditions of Application Layer Gateway (ALG) functions on the home gateway, such as whether the gateway starts a RTSP ALG function, and even the support degree of the ALG etc., so as to facilitate the STB to decide its own strategy of the video-on-demand service etc. accordingly.

Wherein, a message interface is used between the first function service module and the UPnP CP module of the Set-Top Box, and a message interface is also used between the UPnP IGD module and the second function service module of the home gateway, while UPnP protocol messages are used for interaction between the UPnP CP module of the Set-Top Box and the UPnP IGD module of the home gateway.

Figure 2:
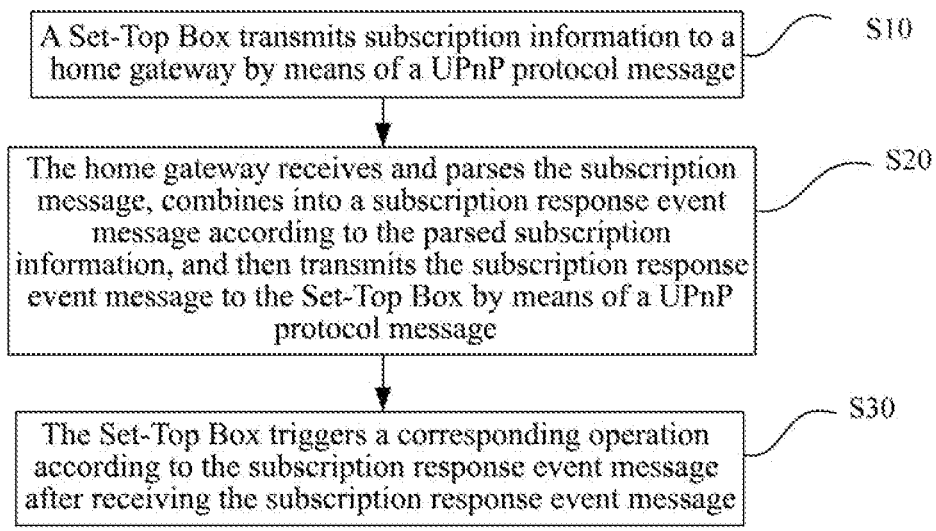
FIG. 2 is a flow chart of a method for implementing an automatic interaction between a Set-Top Box and a home gateway in accordance with the present invention.

FIG. 2 is a flow chart of a method for implementing automatic interaction between a Set-Top Box and a home gateway in accordance with the present invention. As shown in FIG. 2, the method comprises the following steps.

In S10, a Set-Top Box (STB) transmits a subscription message to a home gateway by means of UPnP protocol message.

Specifically, the STB transmits the subscription message to the home gateway via the UPnP CP module, and the existing UPnP IGD object model is expanded in the subscription information, including diagnostic information on the home gateway and real-time information of function services. For example, for the diagnosis function of the STB, the traffic statistic object is expanded, and the parameters are a number of received messages on a certain interface, and a statistic interval and so on; and for the automatic connection initiating function of the STB, the object of the link bearing the IPTV is expanded, and the parameters are a link state, and so on.

In S20, the home gateway receives and parses the subscription message, combines a subscription response event message according to the parsed subscription information, and then transmits the subscription response event message to the STB by means of a UPnP protocol message.

Specifically, the UPnP IGD module on the home gateway parses the subscription information from the subscription message after receiving the subscription message, and issues the subscription information to various corresponding function service modules.

When receiving the subscription information, a specific function service module on the home gateway notifies the UPnP IGD module of the corresponding service information by means of a message.

The UPnP IGD module on the home gateway parses the message, corresponds to the subscribed object, i.e., combining the corresponding service information into a subscription response event message, which is transmitted to the STB.

In S30, the STB triggers a corresponding operation according to the subscription response event message after receiving the subscription response event message.

Specifically, the UPnP CP module of the STB extracts the service information after receiving the subscription response event message, and notifies a specific function service module with a message.

The specific function service module of the STB triggers the corresponding operation according to the service information.

Compared with the existing technology, when the present invention develops the IPTV service on the home network, the STB can take advantage of the UPnP subscription technology, and performs service expansion on the existing object category of a UPnP IGD, which can realize dynamic and automatic interaction between the home gateway and the STB, and complete automatic diagnosis of faults and automatic adjustment of services. For example, the STB automatically re-initiates an Electronic Program Guide (EPG) connection, such as the STB automatically adjusts the strategy of transmitting video-on-demand packages according to whether the Real-Time Streaming Protocol (RTSP) ALG function on the gateway takes effect; and so on, so as to achieve the purposes of the STB diagnosing network faults more accurately or improving the user experience more effectively.

The method for implementing automatic interaction between the Set-Top Box and the home gateway in accordance with the present invention will be illustrated by two embodiments hereinafter.

Embodiment One

Figure 3:
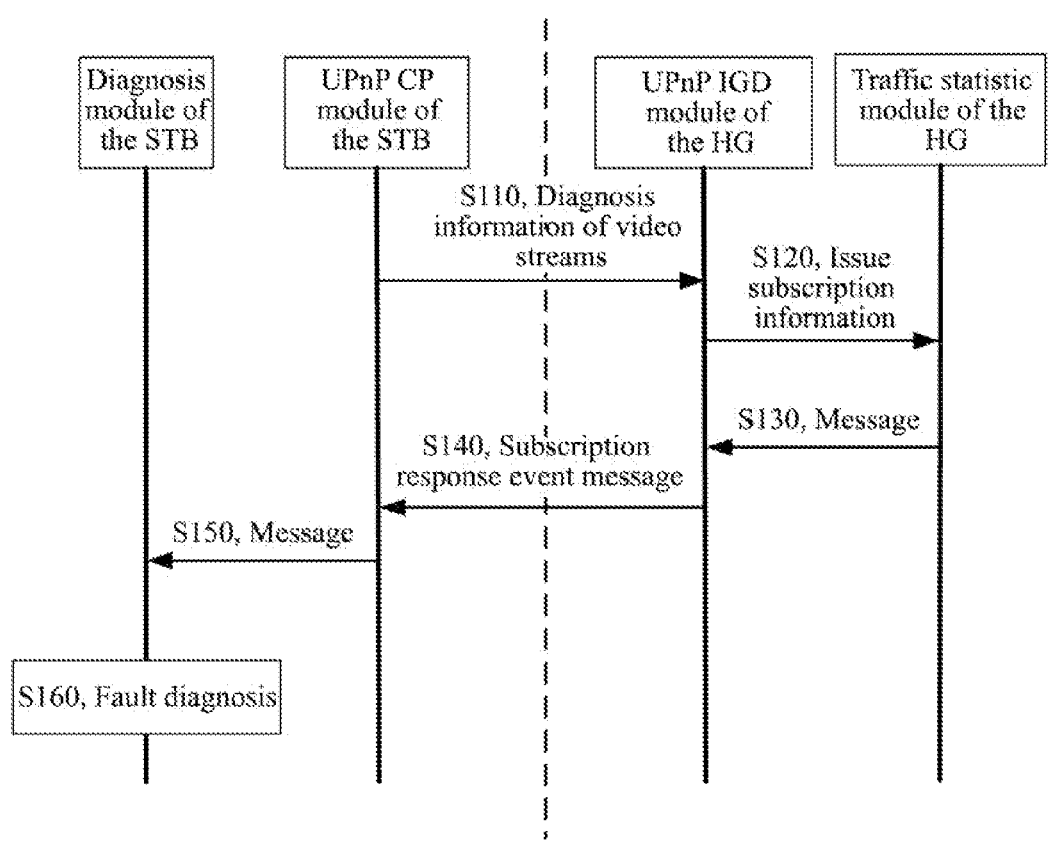
FIG. 3 is a flow chart of a method for implementing an automatic interaction between a Set-Top Box and a home gateway in accordance with a first embodiment of the present invention.

As shown in FIG. 3, the process for diagnosing video streams interruption faults in accordance with the embodiment comprises the following steps:

In S110, the UPnP CP module of the STB subscribes the diagnosis information of the video streams with the home gateway.

In S120, the UPnP IGD module on the home gateway parses the subscription information from the subscription message after receiving the subscription message, and issues the subscription information to the traffic statistic module.

In S130, the traffic statistic module periodically notifies the UPnP IGD module of the video stream traffic information by means of messages.

In S140, the UPnP IGD module on the home gateway parses the message, combines the video stream traffic information into a subscription response event message, and then transmits the subscription response event message to the STB.

In S150, the UPnP CP module of the STB extracts the video stream traffic information, after receiving the subscription response event message, and notifies the diagnosis module with a message.

In S160, the diagnosis module of the STB performs analysis and comparison after receiving the periodic video stream traffic information, accurately locates whether the fault is a gateway fault or not when a fault of the video streams interruption occurs, and records the diagnosis log.

Embodiment Two

Figure 4:
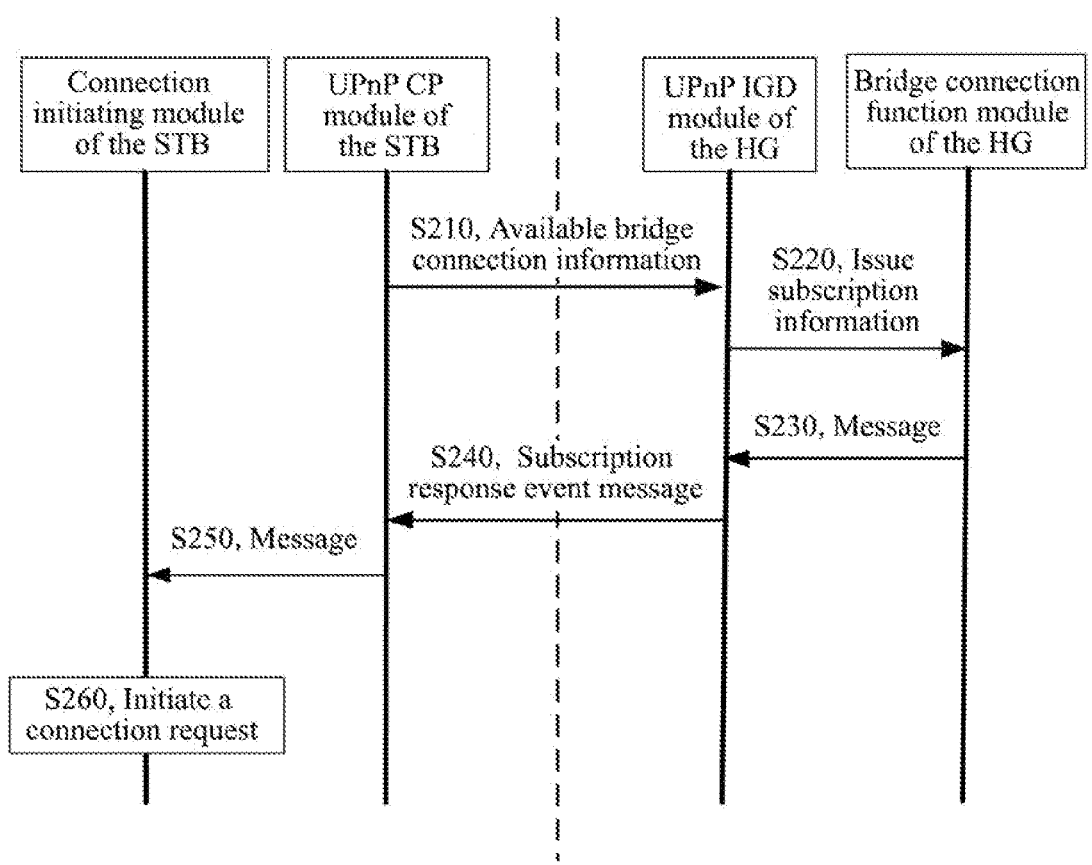
FIG. 4 is a flow chart of a method for implementing an automatic interaction between a Set-Top Box and a home gateway in accordance with a second embodiment of the present invention.

As shown in FIG. 4, a process for the Set-Top box to re-initiate a connection request in accordance with the embodiment comprises the following steps.

In S210, the UPnP CP module of the STB subscribes information of the bridge connection bearing an IPTV service with the home gateway.

In S220, the UPnP IGD module on the home gateway parses the subscription information from the subscription message after receiving the subscription message, and issues the subscription information to a bridge connection function module.

In S230, the bridge connection function module determines whether the bridge connection link is available, and notifies the UPnP IGD module of the bridge connection link information by means of a message when the bridge connection link is available.

In S240, the UPnP IGD module on the home gateway parses the message, combines the bridge connection link information into a subscription response event message, and transmits the subscription response event message to the STB.

In S250, the UPnP CP module of the STB extracts the bridge connection link information after receiving the subscription response event message, and notifies a connection initiating module with a message.

In S260, the connection initiating module of the STB re-initiates a connection request, therefore there is a start time difference between the STB and the home gateway; alternatively, when a fault or service interruption occurs on the home gateway temporarily, the STB automatically initiates a connection request, to recover the service.

Those skilled in the related art should understand that all or a part of steps in the aforementioned method can be completed by programs instructing the related hardware, and the programs can be stored in a computer readable storage medium, such as a read-only memory, a disk, or a CD-ROM etc. Alternatively, all or a part of steps of the aforementioned examples can also be implemented with one or more integrated circuits. Correspondingly, each module/unit in the above examples can be implemented in the form of hardware, or can be implemented in the form of software functional modules. The present invention is not limited to any specific form of combination of hardware and software.

The above description is only the specific implementations of the present invention. Of course, the present invention can also have a plurality of other examples, and those skilled in the related art can make various corresponding modifications and variations according to the present invention, without departing from the spirit and essence thereof of the present invention, while all these corresponding modifications and variations should belong to the protection scope of the appended claims of the present invention.

INDUSTRIAL APPLICABILITY

A STB, a home gateway, a method and a system for implementing interaction between the STB and the home gateway provided by the present take advantage of the UPnP subscription technology, and develop service expansion on the existing object category of a UPnP IGD, thus realizing dynamic and automatic interaction between the home gateway and the STB, and completing automatic diagnosis of faults and automatic adjustment of services.

What is claimed is:

1. A method for implementing interaction between a Set-Top Box and a home gateway, comprising:
   the Set-Top Box transmitting a subscription message to the home gateway by means of a Universal Plug and Play (UPnP) protocol message;
   the home gateway receiving and parsing the subscription message, combining into a subscription response event according to parsed subscription information, and then transmitting the subscription response event to the Set-Top Box by means of a UPnP protocol message; and
   the Set-Top Box, after receiving a subscription response event message, triggering a corresponding operation according to the subscription response event message; wherein,
   the subscription information comprises subscription of diagnostic information of video streams;
   the step of combining into a subscription response event according to parsed subscription information comprises: if the parsed subscription information is the subscription of the diagnostic information of the video streams, acquiring video stream traffic information, and combining the video stream traffic information into the subscription response event;
   the step of triggering a corresponding operation according to the subscription response event message comprises: extracting the video stream traffic information from the subscription response event message, and performing fault diagnosis according to the video stream traffic information.

2. The method of claim 1, wherein,
   combining the video stream traffic information into the subscription response event is periodic.

3. The method of claim 1, wherein, the subscription information comprises subscription of bridge connection information,
   the step of combining into a subscription response event according to parsed subscription information comprises: if the parsed subscription information is the subscription of the bridge connection information, determining whether a bridge connection link is available, and if the bridge connection link is available, combining the information of the available bridge connection link into the subscription response event message;
   during the processing of triggering a corresponding operation according to the subscription response event message, the information of the bridge connection link is extracted, and a connecting request is initiated according to the information of the bridge connection link.

4. A Set-Top Box, comprising:
   at least a processor and a storage device;
   the storage device storing the following modules to be executed by the processor:
   a Universal Plug and Play (UPnP) control point module, configured to transmit a subscription message to a home gateway by means of a UPnP protocol message; and notify a first function service module with a message after receiving a subscription response event message transmitted by the home gateway by means of a UPnP protocol message; and
   the first function service module, configured to, after receiving a notification, trigger a corresponding operation according to the subscription response event message; wherein,
   the subscription information comprises subscription of information of a bridge connection bearing an Internet Protocol Television (IPTV) service; and the subscription response event message carries the information of a bridge connection link bearing the IPTV service,
   the first function service module is a connection initiating module, which is configured to initiate a connection request according to the information of the bridge connection link.

5. The Set-Top Box of claim 4, wherein, the subscription information comprises subscription of information of video streams, and the subscription response event message carries video stream traffic information;

the first function service module is a diagnostic module, which is configured to perform fault diagnosis according to the video stream traffic information.

6. A home gateway, comprising
at least a processor and a storage device;
the storage device storing the following modules to be executed by the processor:
a Universal Plug and Play (UPnP) Internet Gateway Device (IGD) module, and a second function service module, wherein,
the UPnP IGD module is configured to receive and parse a subscription message transmitted by a Set-Top Box by means of a UPnP protocol message, issue parsed subscription information to a corresponding second function service module; and combine service information transmitted by the second function service module into a subscription response event message, and then transmit the subscription response event message to the Set-Top Box by means of a UPnP protocol message;
the second function service module is configured to transmit the corresponding service information to the UPnP IGD module after receiving the subscription information; wherein,
the subscription information is subscription of diagnostic information of video streams, and the second function service module is a traffic statistic module;
the UPnP IGD module is configured to issue the parsed subscription of the diagnostic information of the video streams to the traffic statistic module; combine video stream traffic information transmitted by the traffic statistic module into a subscription response event message, and then transmit the subscription response event message to the Set-Top Box by means of a UPnP protocol message;
the traffic statistic module is configured to transmit the video stream traffic information to the UPnP IGD module, after receiving the subscription of the diagnostic information of the video streams.

7. The home gateway of claim 6, wherein, the subscription information is subscription of information of a bridge connection bearing an Internet Protocol Television (IPTV) service, and the second function service module is a bridge connection function module,
the UPnP IGD module is configured to issue the parsed subscription of the information of the bridge connection bearing the IPTV service to the bridge connection function module, combine the information of the bridge connection link transmitted by the bridge connection function module into a subscription response event message, and then transmit the subscription response event message to the Set-Top Box by means of a UPnP protocol message;
the bridge connection function module is configured to determine whether the bridge connection link bearing the IPTV service is available after receiving the subscription of the information of the bridge connection bearing the IPTV service, and transmit the corresponding information of the corresponding bridge connection link to the UPnP IGD module, if the bridge connection link bearing the IPTV service is available.

8. A system including a Set-Top Box and the home gateway of claim 6, wherein,
the Set-Top Box comprises a Universal Plug and Play (UPnP) control point module and a first function service module; the UPnP control point module is configured to transmit a subscription message to a home gateway by means of a UPnP protocol message; and notify the first function service module with a message after receiving a subscription response event message transmitted by the home gateway by means of a UPnP protocol message; and
the first function service module is configured to, after receiving a notification, trigger a corresponding operation according to the subscription response event message;
the Set-Top Box and the home gateway interact with each other by means of UPnP protocol message.

* * * * *